(12) United States Patent
Chan et al.

(10) Patent No.: US 11,615,810 B1
(45) Date of Patent: Mar. 28, 2023

(54) HARD DISK DRIVE NON-UNIFORM DISK SHROUD CLEARANCE

(71) Applicant: Western Digital Technologies, Inc., San Jose, CA (US)

(72) Inventors: Andre Chan, Palo Alto, CA (US); Yoshiyuki Hirono, Chigasaki (JP); Yuichi Arai, Kawasaki (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/712,023

(22) Filed: Apr. 1, 2022

(51) Int. Cl.
| | |
|---|---|
| *G11B 5/48* | (2006.01) |
| *G11B 33/14* | (2006.01) |
| *G11B 5/596* | (2006.01) |
| *G11B 33/02* | (2006.01) |
| *G11B 33/08* | (2006.01) |

(52) U.S. Cl.
CPC .......... *G11B 5/4826* (2013.01); *G11B 33/022* (2013.01); *G11B 33/08* (2013.01); *G11B 33/148* (2013.01); *G11B 5/596* (2013.01)

(58) Field of Classification Search
CPC ... G11B 33/022; G11B 33/027; G11B 5/4826; G11B 33/08; G11B 33/148; G11B 5/596
See application file for complete search history.

(56) References Cited

U.S. PATENT DOCUMENTS

| | | | |
|---|---|---|---|
| 5,541,791 A * | 7/1996 | Yamasaki | G11B 21/12 360/99.18 |
| 5,631,787 A | 5/1997 | Huang et al. | |
| 5,696,649 A * | 12/1997 | Boutaghou | G11B 33/1446 360/97.16 |
| 6,125,003 A | 9/2000 | Tsuda et al. | |
| 6,462,901 B1 | 10/2002 | Tadepalli | |
| 6,636,379 B2 * | 10/2003 | Rannow | G11B 33/1446 360/97.14 |

(Continued)

FOREIGN PATENT DOCUMENTS

WO    WO2000049616 A1    8/2000

OTHER PUBLICATIONS

Zheng, Yue et al., Stress analysis in functionally graded rotating disks with non-uniform thickness and variable angular velocity, International Journal of Mechanical Sciences, Oct. 2016, 1 page Abstract, vol. 119.

(Continued)

*Primary Examiner* — Brian E Miller
(74) *Attorney, Agent, or Firm* — John D. Henkhaus

(57) ABSTRACT

A hard disk drive enclosure base includes a non-uniform disk shroud surface extending from a top to a floor, the shroud surface including a first portion having a first radius and clearance along the circumference of the shroud surface and a second portion having a lesser second radius and clearance. The second portion of the shroud surface may be positioned at multiple locations where the drive form factor is especially constraining and in view of the need for a sufficient seal land surface for applying a gasket seal around the perimeter of the inner cavity of the base part. Widening the disk shroud clearance where possible can reduce the shear stress exerted at the disk edges thereby reducing the windage drag and associated disk spindle motor power consumption, especially in the context of helium-filled drives in which disk flutter is less of an issue.

19 Claims, 5 Drawing Sheets

(56) References Cited

U.S. PATENT DOCUMENTS

| | | | |
|---|---|---|---|
| 6,665,139 B2 | 12/2003 | Tokuyama et al. | |
| 6,728,062 B1* | 4/2004 | Ou-Yang | G11B 33/08 |
| 6,894,866 B2* | 5/2005 | Nishijima | G11B 33/142 |
| | | | 360/99.18 |
| 7,027,259 B2* | 4/2006 | Myokan | G11B 5/60 |
| 7,554,762 B2* | 6/2009 | Suwa | G11B 25/043 |
| | | | 360/97.14 |
| 7,630,166 B2 | 12/2009 | Rahman | |
| 8,077,429 B2* | 12/2011 | Eguchi | G11B 33/08 |
| | | | 360/97.14 |
| 9,361,925 B2 | 6/2016 | Adachi et al. | |
| 10,510,378 B1* | 12/2019 | Ma | G11B 25/043 |
| 2002/0008934 A1* | 1/2002 | Tadepalli | G11B 33/148 |
| 2002/0030924 A1* | 3/2002 | Shimizu | G11B 33/1446 |
| 2002/0039252 A1* | 4/2002 | Tadepalli | G11B 33/14 |
| 2002/0071202 A1* | 6/2002 | Myokan | G11B 5/60 |
| 2002/0071203 A1* | 6/2002 | Nakamoto | G11B 5/54 |
| 2002/0075592 A1* | 6/2002 | Tokuyama | G11B 33/1446 |
| 2002/0196581 A1* | 12/2002 | Tsang | G11B 5/60 |
| 2003/0179493 A1* | 9/2003 | Kim | G11B 33/08 |
| 2005/0068666 A1* | 3/2005 | Albrecht | G11B 33/1466 |
| | | | 360/99.18 |
| 2005/0141135 A1* | 6/2005 | Soga | G11B 33/08 |
| 2005/0185324 A1 | 8/2005 | Suwa et al. | |
| 2006/0056107 A1* | 3/2006 | Fukaya | G11B 17/028 |
| 2007/0230038 A1* | 10/2007 | Eguchi | G11B 33/08 |
| 2009/0237836 A1* | 9/2009 | Hendriks | G11B 25/043 |
| | | | 360/97.14 |
| 2012/0275052 A1* | 11/2012 | McGuire, Jr. | G11B 33/1466 |
| | | | 360/97.12 |
| 2017/0236557 A1* | 8/2017 | Albrecht | G11B 33/1466 |
| | | | 360/97.12 |
| 2018/0047430 A1* | 2/2018 | Albrecht | G11B 33/1466 |
| 2020/0082847 A1* | 3/2020 | Kato | G11B 5/6005 |

OTHER PUBLICATIONS

Eguchi, Takehiko, Modification of mode shapes of rotating disk by non-uniform gap between disk and shroud, The proceedings of the JSME annual meeting, Sep. 2006, pp. 651-652, 1 page Abstract, vol. 5.

Lennemann, E., Aerodynamic Aspects of Disk Files, IBM J. Res. Develop., Publ. Nov. 1974, Received Mar. 12, 1974, pp. 480-488, Disk File Aerodynamics.

* cited by examiner

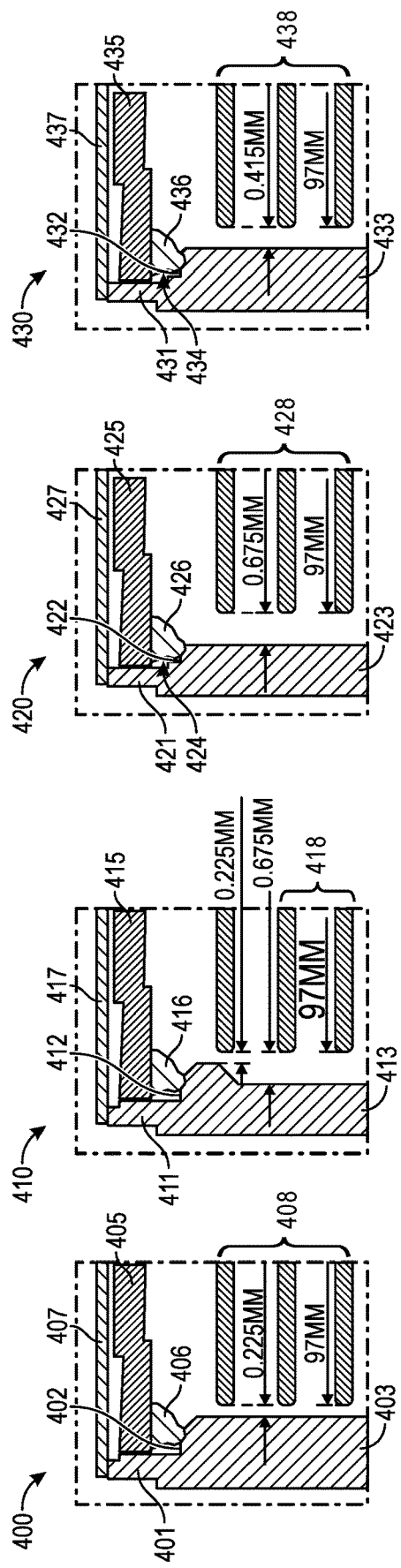

HARD DISK DRIVE NON-UNIFORM DISK SHROUD CLEARANCE

FIELD OF EMBODIMENTS

Embodiments of the invention may relate generally to hard disk drives, and particularly to approaches to non-uniform clearance between recording disks and surrounding shroud structure.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Because the recording disks spin within an HDD during operation, gas flow is generated. Indeed, the air bearing slider (or, generally, gas bearing slider) on which a read-write head is housed relies on such gas flow in order to fly over a disk in order to function as purposed. However, such gas flow generated within an HDD can have detrimental operational effects when impinging upon or interacting with the disk stack. Hence, managing the gas flow within an HDD is considered an ongoing design challenge.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4A is a cross-sectional side diagram illustrating a hard disk drive baseplate sealing sidewall, according to a first embodiment;

FIG. 4B is a cross-sectional side diagram illustrating a hard disk drive baseplate sealing sidewall, according to a second embodiment;

FIG. 4C is a cross-sectional side diagram illustrating a hard disk drive baseplate sealing sidewall, according to a third embodiment;

FIG. 4D is a cross-sectional side diagram illustrating a hard disk drive baseplate sealing sidewall, according to a fourth embodiment.

DETAILED DESCRIPTION

Figure 1:
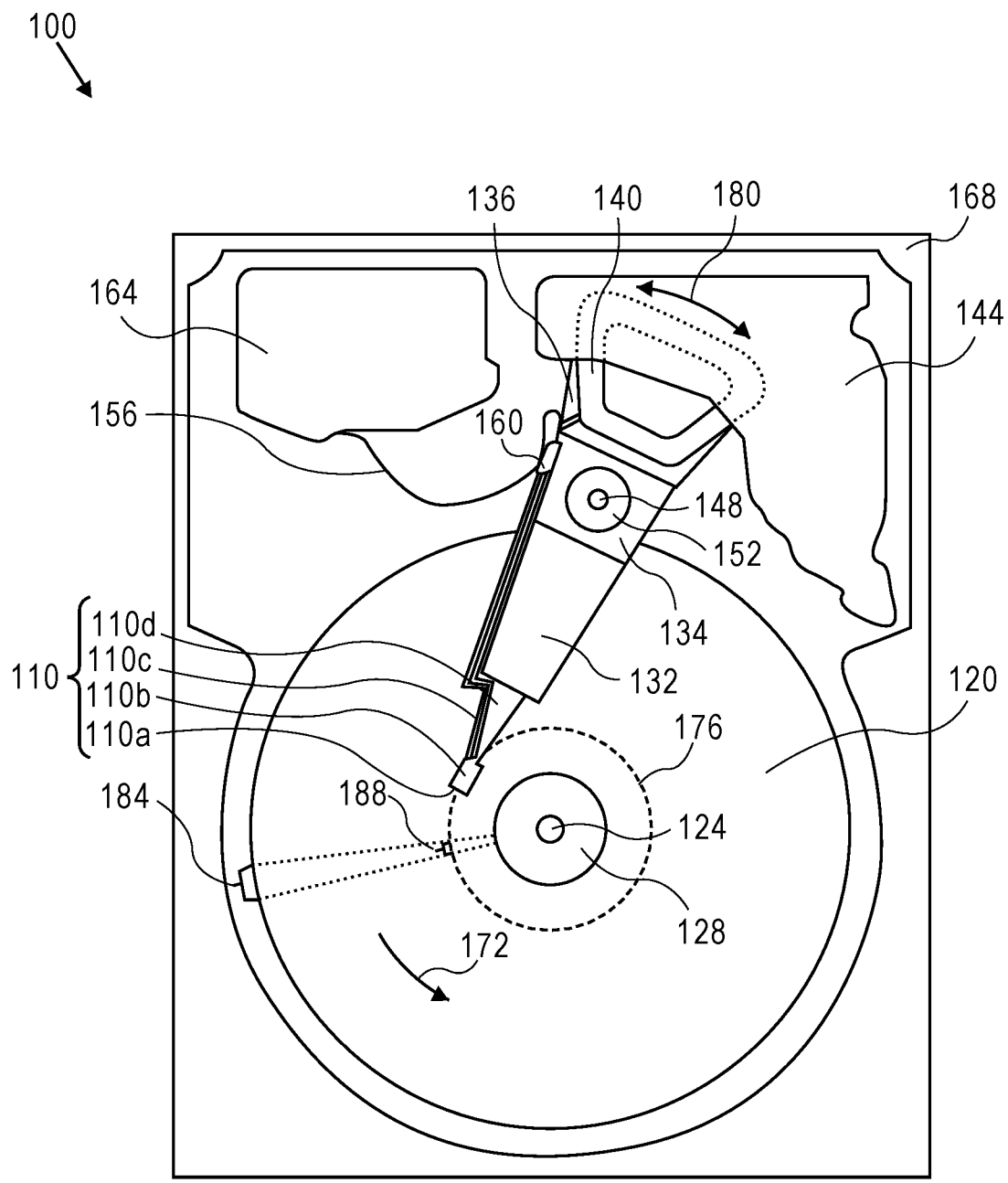
FIG. 1 is a plan view illustrating a hard disk drive, according to an embodiment.

Generally, approaches to non-uniform clearance between recording disks and surrounding shroud structure are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free.

Context

Recall that gas flow generated by spinning recording disks within a hard disk drive (HDD) can have detrimental operational effects when impinging upon or interacting with the disk stack. One such effect of the internal gas flow involves power consumption associated with the spindle motor that spins the disk stack. Using helium instead of air within the drive and/or lowering the motor RPM (revolutions per minute) are known approaches to lowering the power consumption due to windage drag. However, more can be accomplished with respect to lowering spindle motor power consumption.

A disk shroud refers to the structural surface(s) positioned within the interior space and proximate the disk stack such that the shroud substantially circumscribes the circumference of the disks for an arc of a certain span, typically less than the full 360 degrees to make room for the head-stack assembly (HSA) to operate upon the disks. The shroud-to-disk clearance is typically continuous and constant (i.e., uniform) around the perimeter of the disks, and is typically kept as tight as possible to reduce disk flutter, especially for air-based products. Such a tight clearance creates more windage drag that requires the spindle motor to use more power. However, in helium-based (or other lighter-than air gas) drives, there is little to no risk of disk flutter, but the clearance is typically still kept very narrow due to the tradition carried over from the air drives.

Figure 2:
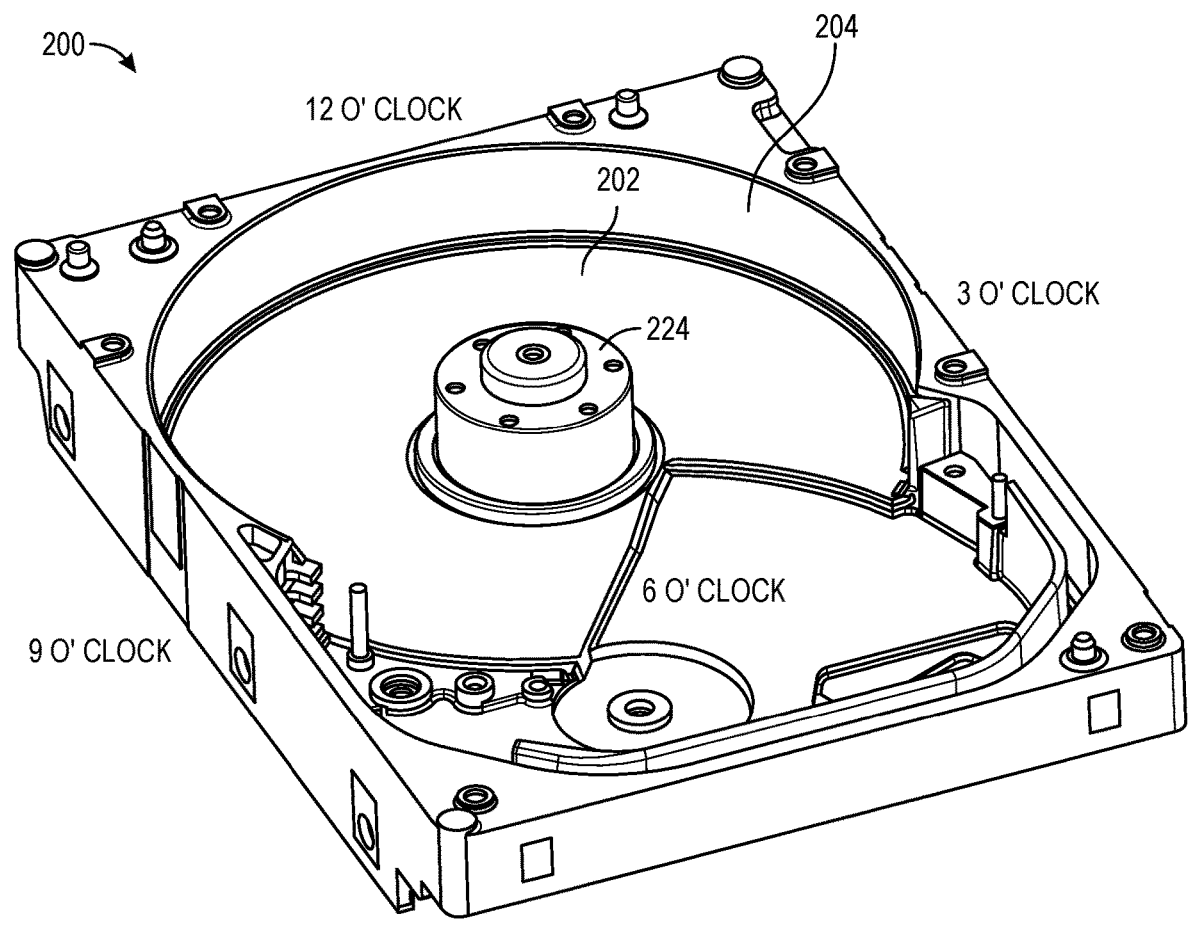
FIG. 2 is a perspective view illustrating an example hard disk drive baseplate having a uniform disk shroud.

FIG. 2 is a perspective view illustrating a hard disk drive (HDD) baseplate. Enclosure baseplate 200 (hereafter, "base 200") represents an example configuration having what is referred to herein as a "uniform" disk shroud having a uniform radius (and a uniform radius of curvature, i.e., the radius of a circle that touches the curve at a given point) around the entire shroud and thus a uniform or constant gap (also, "clearance") with corresponding recording disk(s). Base 200 comprises an annular surface 202 over which a stack of recording disks (not shown here; see, e.g., recording medium 120 of FIG. 1) is installed on a spindle motor 224 (see also, e.g., spindle 124 of FIG. 1), and a uniform disk shroud 204 (or simply "shroud 204") circumscribing the annular surface 202 and thus the circumference or perimeter of the disk stack for a certain span. Typically, a gasket seal (e.g., an FIPG or "formed in place gasket") is installed over the base 200 around and proximal to the inner cavity area. Depicted also in FIG. 2 are positions around the annular surface 202 and the shroud 204 referred to herein as 3 o'clock (or 0°), 12 o'clock (or 90°), and 9 o'clock (or 180°) positions, where the area in which there is no shroud 204 (where an actuator operates) includes a 6 o'clock (or 270°) position.

Non-Uniform Disk Shroud Clearance

According to an embodiment, widening the disk shroud clearance is implemented to reduce the shear stress exerted at the disk rims (or "edges"), thereby reducing the windage torque and drag and power consumption. In general, the wider the shroud clearance, the lower the windage drag until the curve flattens (e.g., at around 3 mm gap). However, the typical designs for helium drives utilize constant shroud clearances, e.g., in the order of less than 0.25 mm. The reason for that being mainly due to the large disk diameter (e.g., 97 mm for some current products) that pushes the thickness limitation of the baseplate at the 3 o'clock, 9 o'clock, and 12 o'clock positions where the drive form factor is especially constraining, and to the need for a seal land (or "seat") surface for applying the gasket seal around the perimeter of the inner cavity of the base part. Thus, because the restriction on widening the shroud clearance is primarily or only due to the wall thickness constraint and seal land issues at the 3 o'clock, 9 o'clock, 12 o'clock positions, according to an embodiment a wider shroud clearance may be available elsewhere along the perimeter of the disk edges.

Figure 3A:
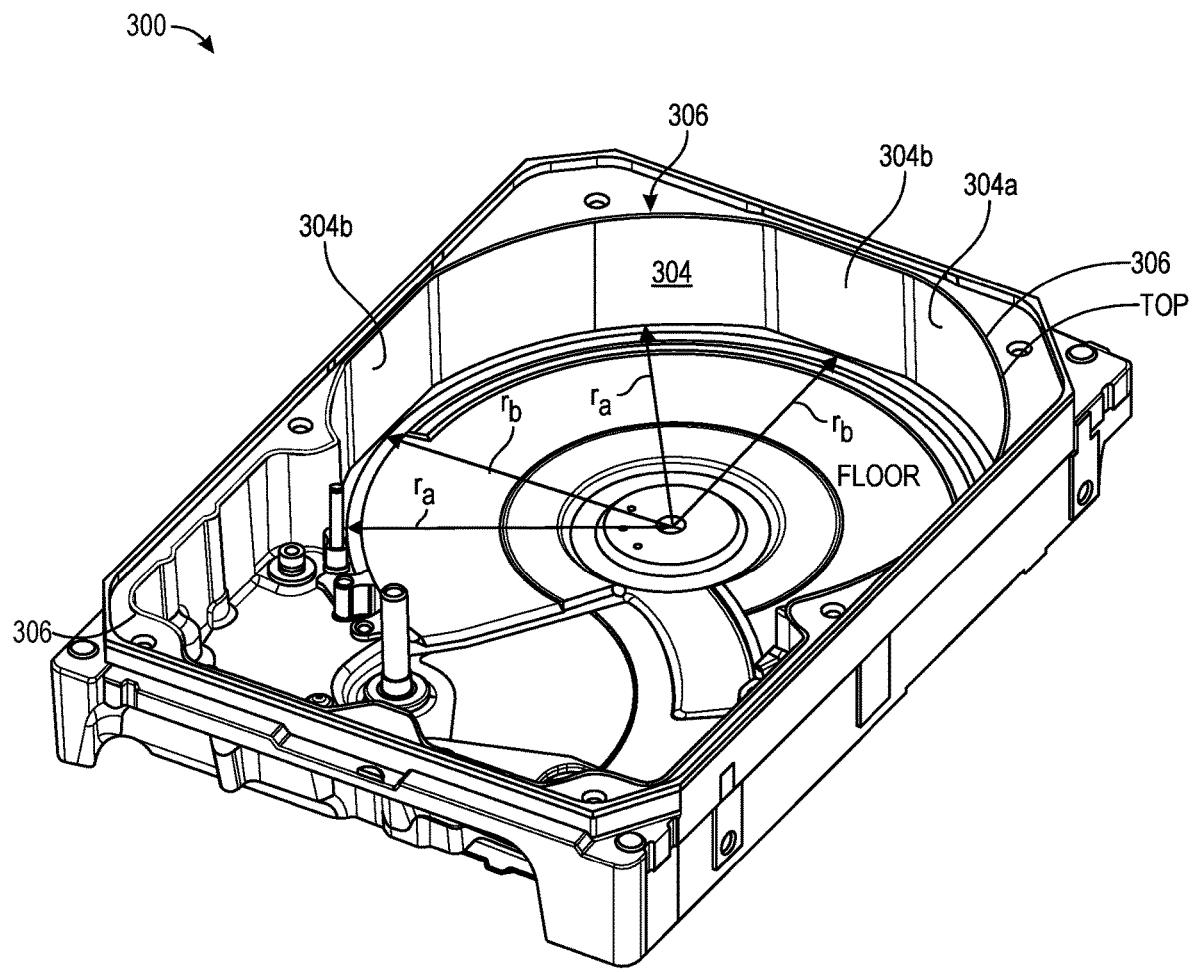
FIG. 3A is a perspective view illustrating a hard disk drive baseplate having a non-uniform disk shroud, according to an embodiment.
Figure 3B:
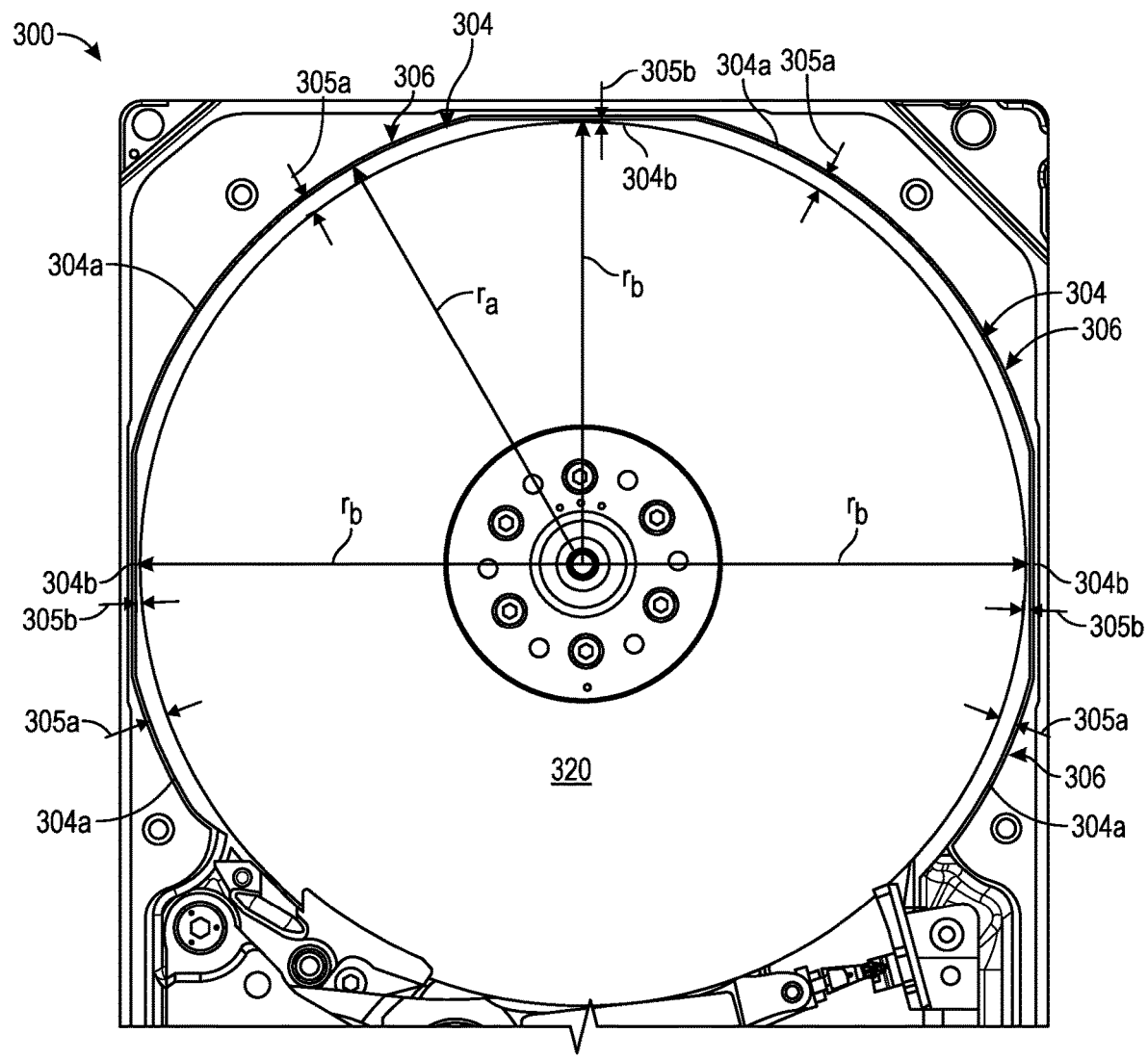
FIG. 3B is a plan view illustrating the hard disk drive baseplate of FIG. 3A with disk stack installed, according to an embodiment.

FIG. 3A is a perspective view illustrating a hard disk drive baseplate having a non-uniform disk shroud, and FIG. 3B is a plan view illustrating the hard disk drive baseplate of FIG. 3A with disk stack installed, both according to embodiments. Enclosure base 300 (or simply "base 300" or "baseplate"), which is configured to house internal components of a hard disk drive (HDD) such as the recording disks, actuator arm assembly, head sliders, etc., comprises an internal non-uniform disk shroud structure, disk shroud 304. The disk shroud 304 is also referred to herein as a circular shroud surface because, as discussed elsewhere, the alternative terms refer to the structural surface(s) positioned within the interior space and proximate the disk stack such that the shroud substantially circumscribes the circumference of the disks for an arc of a certain span. In contrast with the base 200 of FIG. 2, here, base 300 is referred to herein as a "non-uniform" disk shroud in that it has a non-uniform, non-constant radius and thus a non-uniform or non-constant gap with the outer edges or rims of the corresponding recording disk(s) 320 of a disk stack.

Being non-uniform, disk shroud 304 comprises a first portion 304a having a first clearance 305a (or "gap") to an outer edge of the disk media 320 and a second portion 304b having a different second clearance 305b to the outer edge of the disk media 320. Stated otherwise, base 300 comprises a circular disk shroud 304 surface comprising a first portion 304a having a first radius $r_a$ along the circumference of the shroud 304 surface and a second portion 304b having a different second radius $r_b$ along the circumference of the shroud 304 surface. If there were only a single disk medium 320, for example, the first and second clearances 305a, 305b corresponding to the first and second portions 304a, 304b of the disk shroud 304 would be in relation to the plane of the disk medium 320, i.e., a distance between the disk medium 320 edge and the disk shroud 304.

According to an embodiment and as depicted, the second portion 304b is positioned at a plurality of certain positions or locations along the disk shroud 304. That is, the second portion may be positioned at the at the 3 o'clock (or 0°), 12 o'clock (or 90°), and 9 o'clock (or 180°) positions (where for reference the area in which there is no shroud 304, in the lower portion of the FIGS. 3A-3B where an actuator operates, includes a 6 o'clock or 270° position; see, e.g., FIG. 2), where the drive form factor is especially constraining because of the need for a seat or land for a gasket seal 306 around the perimeter of the main cavity of the base 300 in view of the limited space for the base sidewall in such locations, for a given form factor. The position(s) of the second portion 304b and the second clearance(s) 305b may vary from implementation to implementation, however the likelihood is that the smaller clearance(s) is located where the disk media 320 (the "disk stack") is nearest to the outer boundary of the base 300 and thus the outer boundary of the corresponding hard disk drive generally.

The manner in which the first and second portions 304a, 304b of the disk shroud 304 and the transitions between such portions are implemented may vary from implementation to implementation. For example and according to an embodiment, the second portion(s) 304b may constitute a substantially flat surface (e.g., viewed from above as a straight line) for a certain span of the circumference of the disk shroud 304, as depicted in FIGS. 3A-3B. Stated otherwise in terms of the radius of curvature, the radius of curvature of the second portion 304*b* would be infinite. For example and according to an embodiment, the second portion(s) 304*b* may constitute a curvilinear surface (e.g., viewed from above as an arc) for a certain span of the circumference of the disk shroud 304. In this case, the second portion 304*b* has a finite second radius of curvature different from a first radius of curvature of the first portion 304*a*, i.e., the different portions 304*a*, 304*b* may be curved differently. Still further and according to an embodiment, each of the first and second portions 304*a*, 304*b* could share a substantially same radius of curvature but with different effective center points of such radius of curvature, and thus still have different radii. In any case, the second radius $r_b$ of the second portion 304*b* of the disk shroud 304 is less than the first radius $r_a$ of the first portion 304*a* of the disk shroud 304, and the second radius $r_b$ is substantially constant from the top of the disk shroud 304 to the floor of the disk shroud 304. Therefore, in the case of a disk stack, the gap or clearance between the outer edges of the disk media 320 in the disk stack and the second portion 304*b* of the disk shroud 304 is substantially constant along the effective height of the disk stack.

Expanding Shroud Clearance at Constrained Locations

With reference back to FIGS. 3A-3B, recall that a purpose of widening the clearance 305*a* where readily possible, e.g., at the first portion(s) 304*a* of the disk shroud 304, is for reducing the shear stress exerted at the disk edges, thereby reducing the windage torque and drag and power consumption. This is especially applicable to helium or other lighter-than-air gas filled hard disk drives, in which disk flutter and associated "minimal clearance" design goals are less of a compromising issue. However, widening the clearance 305*b* at the second portion(s) 304*b* of the disk shroud 304 is contemplated, in view of the constraints associated with drive form factor, sidewall thickness, and seal seating, for further reducing the shear stress exerted at the disk edges and thereby attempting to further reduce the associated disk spindle motor power consumption.

FIG. 4A is a cross-sectional side diagram illustrating a hard disk drive baseplate sealing sidewall, according to a first embodiment. Base sidewall structure 400 represents an example of a sidewall configuration which includes the disk shroud/surface for a hard disk drive (HDD) employing a 97 mm (millimeter) diameter recording disk(s), and in which no additional processing of the base casting is performed to widen the disk shroud clearance. Base sidewall structure 400 comprises an upper rib 401 portion having a first thickness, a seal seat 402 or land structure abutting and protruding inward from the upper rib 401 and having a second thickness greater than the first thickness, and a lower sidewall 403 portion below the seal seat 402 and having a third thickness greater than the first thickness. Here, with the 97 mm disk media and with a disk shroud diameter of 97.45 mm, for a non-limiting example, there is a 0.225 mm clearance between each disk medium 408 and the lower sidewall 403. A first cover 405 is shown over a gasket seal 406 (e.g., a FIPG seal) that is seated on the seal seat 402, to seal (e.g., semi-hermetically) the interface between the first cover 405 and the base sidewall structure 400, and a second cover 407 coupled with and hermetically-sealed with (e.g., welded to) the base sidewall structure 400 over the first cover 405.

FIG. 4B is a cross-sectional side diagram illustrating a hard disk drive baseplate sealing sidewall, according to a second embodiment. Here, base sidewall structure 410 depicts a sidewall configuration which includes the disk shroud/surface for a hard disk drive (HDD) again employing a 97 mm diameter recording disk(s), and in which additional processing by undercut machining of the base casting is performed to widen the disk shroud clearance, such as at the 3 o'clock, 9 o'clock, 12 o'clock positions. Base sidewall structure 410 comprises an upper rib 411 portion having a first thickness, a seal seat 412 structure abutting and protruding inward from the upper rib 411 and having a second thickness greater than the first thickness, and a lower sidewall 413 portion below the seal seat 412 and having a third thickness greater than the first thickness and less than the second thickness. According to an embodiment, the third thickness of the lower sidewall 413 is substantially constant extending downward to the floor of the disk shroud. Analysis has shown that a suitable dimension for the second thickness of the seal seat 412 for the intended purpose is in a range of 1.1 mm to 2.1 mm, and a suitable difference between the third thickness of the lower sidewall 413 and the second thickness of the seal seat 412 for the intended purpose (e.g., the "undercut" dimension) is in a range of 0.4 mm to 1.4 mm. Here, with the 97 mm disk media and with a disk shroud diameter of 98.35 mm at the lower sidewall 413, for a non-limiting example, there is a 0.675 mm maximum clearance (0.45 mm additional gained over base sidewall structure 400 of FIG. 4A) between the disk media 418 and the lower sidewall 413. However, undercut machining is considered relatively difficult, with marginal accuracy and increased machining time over the typical baseline machining of FIG. 4A simply to compensate for baseplate casting draft angle(s). A first cover 415 is shown over a gasket seal 416 (e.g., a FIPG seal) that is seated on the seal seat 412, to seal (e.g., semi-hermetically) the interface between the first cover 415 and the base sidewall structure 410, and a second cover 417 coupled with and hermetically-sealed with (e.g., welded to) the base sidewall structure 410 over the first cover 415.

FIG. 4C is a cross-sectional side diagram illustrating a hard disk drive baseplate sealing sidewall, according to a third embodiment. Here, base sidewall structure 420 depicts a sidewall configuration which includes the disk shroud/surface for a hard disk drive (HDD) again employing a 97 mm diameter recording disk(s), and in which additional processing by machining of the base casting is performed to widen the disk shroud clearance, such as at the 3 o'clock, 9 o'clock, 12 o'clock positions. Base sidewall structure 420 comprises an upper rib 421 portion having a first thickness, a seal seat 422 structure abutting and protruding inward from the upper rib 421 and having a second thickness greater than the first thickness, and a lower sidewall 423 portion below the seal seat 422 and having a third thickness greater than the first thickness. According to an embodiment, the third thickness of the lower sidewall 423 is substantially constant extending downward to the floor of the disk shroud. Here, with the 97 mm disk media and with a disk shroud diameter of 98.35 mm at the lower sidewall 423, for a non-limiting example, there is again a 0.675 mm clearance (0.45 mm additional gained over base sidewall structure 400 of FIG. 4A) between each disk medium 428 and the lower sidewall 423. A first cover 425 is shown over a gasket seal 426 (e.g., a FIPG seal) that is seated on the seal seat 422, to seal (e.g., semi-hermetically) the interface between the first cover 425 and the base sidewall structure 420, and a second cover 427 coupled with and hermetically-sealed with (e.g., welded to) the base sidewall structure 420 over the first cover 425.

Here, the upper rib 421 is machined more than the upper rib 411 of FIG. 4B, thus upper rib 421 is thinner than upper rib 411. Base sidewall structure 420 further comprises an offset step (or stepped) surface 424 between the upper rib portion 421 and the seal seat 422, whereby the first cover 425 can be expanded to extend over the step surface 424 to meet or come substantially close to meeting the upper rib 421, and the gasket seal 426 is seated on the seal seat 422 inboard of the step surface 424. However, the first cover 425 sealing may be of concern because the sealing surface of seal seat 422 is reduced, and laser welding of the second cover 427 to the thinner upper rib 421 may also be of concern due to the thinner upper rib 421. Furthermore, there may be a reduction in base stiffness for torsion due to thinner sidewall portions. Advantageously, though, base sidewall structure 420 is configured to support a 98 mm disk configuration.

FIG. 4D is a cross-sectional side diagram illustrating a hard disk drive baseplate sealing sidewall, according to a fourth embodiment. Here, base sidewall structure 430 depicts a sidewall configuration which includes the disk shroud/surface for a hard disk drive (HDD) again employing a 97 mm diameter recording disk(s), and in which additional processing by machining of the base casting is performed to widen the disk shroud clearance, such as at the 3 o'clock, 9 o'clock, 12 o'clock positions. Base sidewall structure 430 comprises an upper rib 431 portion having a first thickness, a seal seat 432 structure abutting and protruding inward from the upper rib 431 and having a second thickness greater than the first thickness, and a lower sidewall 433 portion below the seal seat 432 and having a third thickness greater than the first thickness. According to an embodiment, the third thickness of the lower sidewall 433 is substantially constant extending downward to the floor of the disk shroud. Here, with the 97 mm disk media and with a disk shroud diameter of 97.83 mm at the lower sidewall 433, for a non-limiting example, there is a 0.415 mm clearance (0.19 mm additional gained over base sidewall structure 400 of FIG. 4A) between each disk medium 438 and the lower sidewall 433. A first cover 435 is shown over a gasket seal 436 (e.g., a FIPG seal) that is seated on the seal seat 432, to seal (e.g., semi-hermetically) the interface between the first cover 435 and the base sidewall structure 430, and a second cover 437 coupled with and hermetically-sealed with (e.g., welded to) the base sidewall structure 430 over the first cover 435.

Here again the upper rib 431 is machined more than the upper rib 411 of FIG. 4B, thus upper rib 431 is thinner than upper rib 411. Base sidewall structure 430 further comprises an offset step (or stepped) surface 434 between the upper rib portion 431 and the seal seat 432, whereby the first cover 435 can be expanded to meet or come substantially close to meeting the upper rib 431 and the gasket seal 436 is seated on the seal seat 432 inboard of the step surface 434. While base sidewall structure 430 provides a larger seal seat 432 (e.g., same as seal seat 402 of FIG. 4A) than seal seat 422 of FIG. 4C and therefore the first cover 435 sealing is of less concern, concern about laser welding of the second cover 437 to the thinner upper rib 431 may remain.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
    a disk medium rotatably mounted on a spindle;
    a head slider housing a read-write transducer configured to read from and to write to the disk medium;
    an actuator configured for moving the head slider to access portions of the disk medium; and
    an enclosure base housing the disk medium, the head slider, and the actuator, wherein the base includes an internal disk shroud structure circumferentially proximate to a portion of the disk medium, the disk shroud including:
        a first portion having a first clearance, in a plane of the disk medium, to an outer edge of the disk medium, and
        a second portion having a different second clearance, in the plane of the disk medium, to the outer edge of the disk medium;
    wherein:
        the second clearance is less than the first clearance,
        the second portion is positioned at a plurality of locations along the disk shroud at which the disk shroud is integral with a base sidewall structure, and
        the base sidewall structure comprises an upper rib portion having a first thickness, a seal seat structure abutting and protruding inward from the upper rib portion and having a second thickness greater than the first thickness, and a lower sidewall portion below the seal seat structure.

2. The HDD of claim 1, wherein the second portion is positioned at a 0° position, a 90° position, and a 180° position of the base, with an arm of the actuator being near a 270° position.

3. The HDD of claim 1, wherein:
the disk medium is part of a disk stack of a plurality of disk media;
and
the second clearance is substantially constant along the height of the disk stack.

4. The HDD of claim 1, wherein:
the lower sidewall portion of the base sidewall structure has a third thickness greater than the first thickness and less than the second thickness.

5. The HDD of claim 1, wherein a third thickness of the lower sidewall portion of the base sidewall structure is substantially constant extending downward to a floor of the base.

6. The HDD of claim 1, further comprising:
a first cover coupled to the base; and
a gasket seal configured to seal an interface between the first cover and the base;
wherein the gasket seal seats on the seal seat structure.

7. The HDD of claim 6, wherein:
the base sidewall structure further comprises an offset step surface between the upper rib portion and the seal seat structure; and
the first cover extends over the step surface and substantially to the upper rib portion.

8. The HDD of claim 1, wherein:
the second thickness of the seal seat structure is in a range consisting of 1.1 to 2.1 millimeters; and
the difference between a third thickness of the lower sidewall portion of the base sidewall structure and the second thickness of the seal seat structure is in a range consisting of 0.4 to 1.4 millimeters.

9. An enclosure base part for a hard disk drive, the base part comprising:
an internal circular shroud surface extending from a top to a floor, the shroud surface comprising:
a first portion having a first radius along the circumference of the shroud surface, and
a second portion having a different second radius along the circumference of the shroud surface;
wherein:
the second radius is less than the first radius,
the second portion is positioned at a plurality of locations along the shroud surface at which the shroud surface is integral with a base sidewall structure, and
the base sidewall structure comprises an upper rib portion having a first thickness, a seal seating structure abutting and protruding inward from the upper rib portion and having a second thickness greater than the first thickness, and a lower sidewall portion below the seal seating structure.

10. The enclosure base part of claim 9, wherein the second portion has an infinite radius of curvature.

11. The enclosure base part of claim 9, wherein the second portion has a finite second radius of curvature different from a first radius of curvature of the first portion.

12. The enclosure base part of claim 9, wherein the second portion is positioned at a 0° position, a 90° position, and a 180° position of the base.

13. The enclosure base part of claim 9, wherein:
the second radius is substantially constant from the top to the floor.

14. The enclosure base part of claim 9, wherein:
a third thickness of the lower sidewall portion is greater than the first thickness.

15. The enclosure base part of claim 9, wherein a third thickness of the lower sidewall portion is less than the second thickness.

16. The enclosure base part of claim 9, wherein a third thickness of the lower sidewall portion is substantially constant extending downward to the floor.

17. The enclosure base part of claim 9, wherein:
the base sidewall structure further comprises an offset step surface between the upper rib portion and the seal seating structure, configured for seating a cover to extend over the step surface and substantially to the upper rib portion for coupling with the base part.

18. A lighter-than-air gas-filled hard disk drive (HDD) comprising:
a plurality of disk media rotatably mounted on a spindle;
a head slider housing a read-write transducer configured to read from and to write to at least one disk medium of the plurality of disk media;
means for moving the head slider to access portions of the disk medium; and
means for housing the disk medium, the head slider, and the means for moving, wherein the means for housing includes an internal disk shroud structure circumferentially proximate to a portion of the disk media, the disk shroud secure including:
a first portion having a first gap to an outer edge of the disk media, and
a second portion having a different second gap to the outer edge of the disk media at a plurality of positions along the circumference of the disk shroud structure,
wherein:
the second gap is less than the first gap and the second gap is substantially constant along the height of the plurality of disk media,
the second portion is positioned at a plurality of locations along the disk shroud structure at which the disk shroud structure is integral with the means for housing, and
a sidewall structure of the means for housing comprises an upper rib portion having a first thickness, a seal seat structure abutting and protruding inward from the upper rib portion and having a second thickness greater than the first thickness, and a lower sidewall portion below the seal seat structure.

19. The HDD of claim 1, wherein a third thickness of the lower sidewall portion of the base sidewall structure is greater than the first thickness.

\* \* \* \* \*